Else

[11] Patent Number: 4,569,537
[45] Date of Patent: Feb. 11, 1986

[54] ANCHORAGE MEANS FOR VEHICLE SAFETY BELTS

[75] Inventor: Robert F. Else, Southampton, England

[73] Assignee: Britax (Wingard) Limited, Chichester, England

[21] Appl. No.: 605,775

[22] Filed: May 1, 1984

[30] Foreign Application Priority Data

May 17, 1983 [GB] United Kingdom ............... 8313622

[51] Int. Cl.$^4$ ............................................. B60R 22/00
[52] U.S. Cl. .................................................. 280/808
[58] Field of Search ............................. 280/801, 808;
248/297.2, 297.3, 243, 244, 246; 292/137

[56] References Cited

U.S. PATENT DOCUMENTS 4,453,741  6/1984  Hipp et al. ........................... 280/801

FOREIGN PATENT DOCUMENTS

| 86633 | 8/1983 | European Pat. Off. ............ 280/801 |
| 7821970 | 11/1978 | Fed. Rep. of Germany . |
| 2932505 | 2/1981 | Fed. Rep. of Germany . |
| 66049 | 4/1982 | Japan ................................. 280/801 |
| 1497397 | 1/1978 | United Kingdom ............... 280/808 |
| 2070414 | 9/1981 | United Kingdom . |
| 2081568 | 2/1982 | United Kingdom . |

Primary Examiner—Joseph F. Peters, Jr.
Assistant Examiner—Ross Weaver
Attorney, Agent, or Firm—Hayes, Davis & Soloway

[57] ABSTRACT

An adjustable shoulder anchorage for a vehicle safety belt comprises a vertically extending track mounted on the interior of the vehicle body above the level of the shoulders of an occupant of an adjacent seat and having a plurality of indexing formations facing away from said seat. A traveller is mounted on the track and carries a guide member having a slot for receiving the strap of the safety belt. A latch member is mounted on the traveller for movement between a first position in which a latching formation thereon engages with one of the indexing means on the track so as to inhibit movement of the traveller along the track and a second position in which the latching formation is disengaged therefrom. The traveller includes a base plate on the same side of the track as the indexing formations and having emergency latching formations for engagement therewith, together with deformable means for holding the base plate away from the indexing formations in normal use. If the shoulder anchorage is subject to excessive load, the deformable means distorts to allow the emergency latching formations on the base plate to engage with the indexing formations. A pivotally mounted manual release lever is movable between a first position in which a blocking formation thereon engages with a complementary formation on the latch member to inhibit movement of the latter from its first position, an intermediate position in which said blocking formation is disengaged from said complementary formation and an actuating formation engages with the latch member, and a third position in which said actuating formation has moved the latch member into its second position.

5 Claims, 6 Drawing Figures

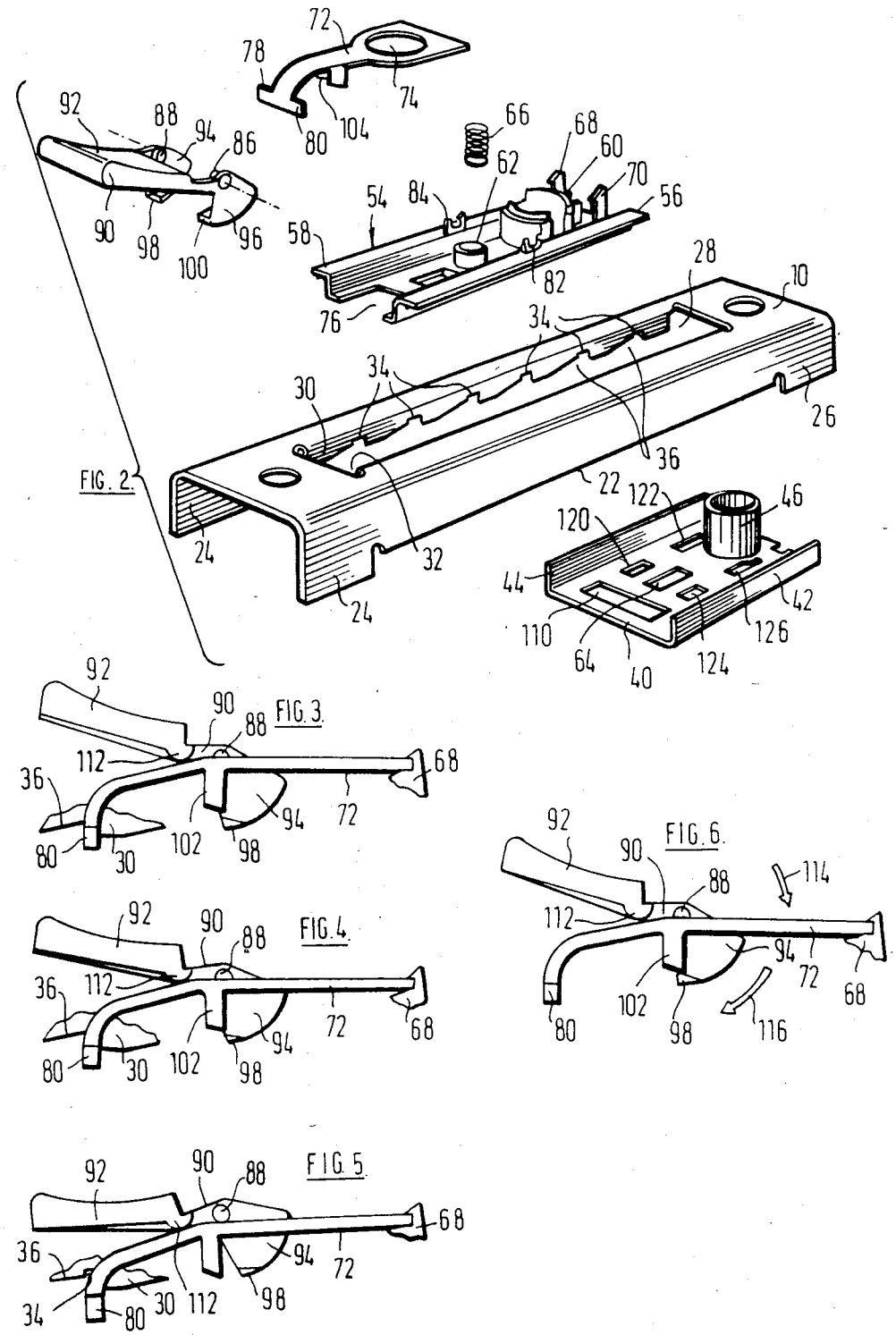

ANCHORAGE MEANS FOR VEHICLE SAFETY BELTS

This invention relates to anchorage means for vehicle safety belts and more particularly to anchorage means of the kind which are adapted to be mounted on a vehicle body above the shoulder level of the occupant of an adjacent seat for reception of the shoulder strap of the safety belt. Anchorage means of this kind are commonly referred to as pillar loops. The present invention is particularly concerned with the provision of a pillar loop of adjustable height.

According to the invention in one aspect, an adjustable pillar loop assembly comprises a vertically extending track mounted on the interior of the vehicle body above the level of the shoulders of an occupant of an adjacent seat and having a plurality of indexing formations facing away from said seat, a traveller mounted on the track, a guide member having a slot for receiving the strap of a safety belt pivotally mounted on the traveller on the opposite side of the track to the indexing formations so that the guide member is angularly moveable about a horizontal axis, a latch member mounted on the traveller for movement between a first position in which a latching formation thereon engages with one of the indexing means on the track so as to inhibit movement of the traveller along the track and a second position in which the latching formation is disengaged therefrom, resilient means for biasing the latch member into its first position and manual release means for moving the latch member into its second position, the traveller including a base plate on the same side of the track as the indexing formations and having complementary formations for engagement therewith, together with deformable means for holding the base plate away from the indexing formations.

In normal use, the traveller is held in a selected position by engagement of the latch member with one of the indexing formations and is movable along the track after actuation of the manual release means. However, if the pillar loop is subject to excessive load, for example during an accident, the deformable means distorts to allow the latching formations on the base plate to engage with the indexing formations at a lower load than that at which the latch member might distort or be displaced from its normal first position. Thus the mechanism is inherently "fail-safe".

According to the invention in another aspect, an adjustable pillar loop assembly comprises a vertically extending track mounted on the interior of a vehicle body above the level of the shoulders of an occupant of an adjacent seat and having a plurality of indexing formations thereon, a traveller mounted on the track, a guide member having a slot for receiving the strap of a safety belt mounted on the traveller, a latch member mounted on the traveller for movement between a first position in which a latching formation thereon engages with one of the indexing formations so as to inhibit movement of the traveller along the track and a second position in which the latching formation is disengaged therefrom, resilient means for biasing the latching member into its first position, and pivotally mounted manual release means moveable between a first position in which a blocking formation thereon engages with a complementary formation on the latch member to inhibit movement of the latter from its position, an intermediate position in which said blocking formation is disengaged from said complementary formation and an actuating formation engages with the latch member, and a third position in which said actuating formation has moved the latch member into its second position.

Thus, the blocking formation on the release means inhibits accidental movement of the latch member to its second position due to inertia as a result of high lateral acceleration of the vehicle, for example due to impact. Preferably the manual release means is pivotally mounted and balanced about its pivot point so as not to be susceptible to such lateral acceleration. Alternatively or additionally, the blocking formation and the complementary formation on the latch member may be so shaped that any tendency of the latch member to move towards its second position, when the manual release means is in its first position, resists movement of the manual release means towards its intermediate position.

An embodiment of the invention will now be described, by way of example, with reference to the accompanying drawings, in which:

FIG. 2 is an exploded view of the assembly shown in FIG. 1;

FIGS. 3, 4 and 5 are schematic diagrams illustrating the mechanism in the fully latched, partially released and fully released positions respectively; and FIG. 6 is a schematic diagram, similar to FIG. 3, illustrating the latching mechanism under the effect of high lateral acceleration.

Figure 1:
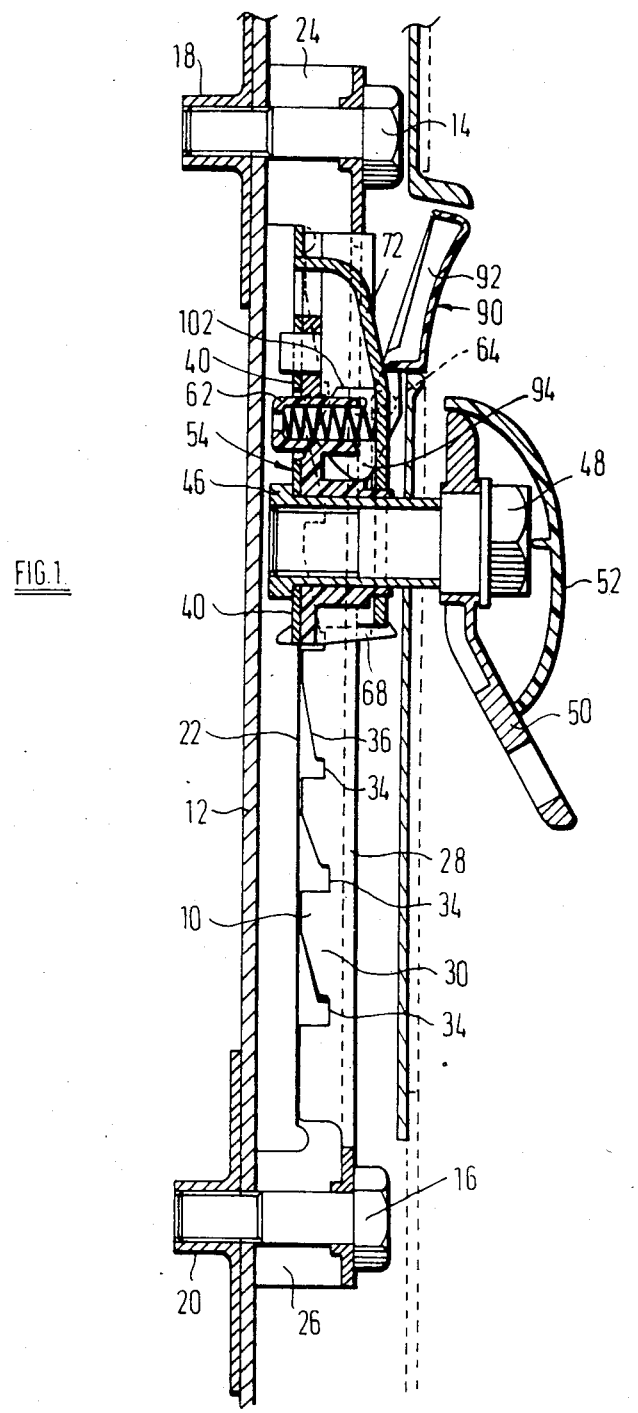
FIG. 1 is a cross-sectional view of an adjustable pillar loop assembly in accordance with the invention, fitted to the B-post of a motor car.

Referring to FIG. 1, the track 10 of an adjustable pillar loop assembly in accordance with the invention is mounted on the B-post 12 by two bolts 14 and 16 which engage in respective tapped back plates 18 and 20 secured to the inside of the B-post 12. As can be seen from FIG. 2, the track 10 comprises a U-shaped channel formed of sheet metal. The central region 22 of each of the side limbs of the U-shape is cut away so as to leave legs 24 and 26 at each end which engage with the B-post 12 so as to leave clearance between the edge of the central zone 22 and the confronting surface of the B-post 12. An elongate slot 28 is formed in the centre of the track 10 and has its edges turned inwardly so as to form flanges 30 and 32 extending towards the B-post 12 to the same depth as the zones 22 of the side limbs of the U-shape. A regularly spaced series of notches 34, each having its upper edge cut away to form a ramp 36, is formed in the edge of each of the flanges 30 and 32.

A traveller for movement along the track 10 comprises a base plate 40 having side flanges 42 and 44 which are dimensioned to embrace the side limbs of the track with the central part of the base plate located in alignment with the central zones 22 of the side limbs of the track. A threaded boss 46 is secured to the base plate 40 and receives a bolt 48 which pivotally supports a slotted member 50 for receiving the seat belt strap (not shown). The head of the bolt 48 is covered by a snap-on plastics cover 52.

The traveller also comprises a plastic body 54 having flanges 56 and 58 which engage on the outwardly facing surface of the track 10. The body 54 also includes a boss 60 which surrounds the boss 46 and a pocket 62 which projects through an opening 64 in the base plate 40 and serves to accommodate a compression spring 66. The various projections on the body 54 are dimensioned to be a snap-fit with the complementary formations on the base plate 40.

On the opposite side of the boss 60 to the pocket 62, the body 54 has a pair of upstanding lugs 68 and 70 with shoulders facing towards the boss 60. One end of a latch member 72 engages under the shoulders of the lugs 68 and 70, the boss 68 projecting through a hole 74 in the latch member. The other end of the latch member 72 projects through a slot 76 in the other end of the body and has shoulders 78 and 80 which engage under the edges of the slot 76, the spring 66 serving to bias the latch member 72 to maintain such engagement.

On each side of the pocket 62, the body 54 has snap-fit bearings 82 and 84 for respective stub axles 86 and 88 formed on a release lever 90. The lever 90 comprises a manually accessible pushpad 92 and two segmental flanges 94 and 96 each of which has an inwardly facing shoulder 98, 100 on its radially outer edge. The latch member 72 has a respective projection 102, 104 projecting from each side thereof parallel to the segments 94 and 96 in alignment with the shoulders 98 and 100.

In its normal engaged position, as illustrated in FIGS. 1 and 3, the shoulders 78 and 80 on the end of the latch member 72 engage both in a transverse slot 110 in the base plate 40 and in one of the pairs of notches 34 in the flanges 30 and 32, thereby inhibiting movement of the traveller along the track. As can best be seen from FIG. 3, the latch member 72, which is biased on the clockwise direction by the compression spring 64, pushes upwardly on a cam formation 112 on the underside of the pushpad 92. The shoulders 98 and 100 on the flanges 94 and 96 are aligned with but not actually in contact with the ends of the projections 102 and 104 on the latch member 72.

Turning to FIG. 4, if the pushpad 92 is depressed, the cam formation 112 thereon depresses the latch member 72 but, before the projections 102 and 104 come into engagement with the shoulders 98 and 100, the latter have pivoted out of the path of the former. Further depression of the pushpad 92 displaces the latch member 72 sufficiently to move the shoulders 78 and 80 clear of the notches 34 in the flanges 30 and 32 so that the traveller can be freely moved along the track 10, the ramps 36 on the latter facilitating re-engagement of the latch if movement is in the downward direction. The latch 72 then re-engages when the pushpad 92 is released and the shoulders 78 and 80 are in alignment with a pair of notches 34.

Turning to FIG. 6, if the mechanism is subject to very high acceleration in the upward direction, as illustrated in the drawing, the inertia of the latch member 72 could be sufficient to overcome the force exerted by the spring 64, the latch member 72 would tend to pivot in the direction indicated by the arrow 114 and cause inadvertent disengagement of the shoulders 78 and 80 from the notches 34. However, before such disengagement could take place, the projections 102 and 104 would come into engagement with the shoulders 98 and 100 on the segments 94 and 96 of the release lever 90. The interengaging faces of the projections 102 and 104 on the one hand and the shoulders 98 and 100 on the other are inclined so that the force exerted by the latch pivoting in the direction indicated by the arrow 114 would cause the release lever 90 to pivot in the direction indicated by the arrow 116 and thus be more firmly held in position. The release lever 90 is approximately balanced about its pivot points 86 and 88 so as not to be affected by any such high acceleration.

If the pillar loop were subject to a very large load, for example in an accident, the track 10 and/or the base plate 40 could be bent and the resulting distortion could cause inadvertent release of the latch 72. Reverting to FIG. 2, in order to guard against this eventuality, additional openings 120, 122 and 124, 126 are formed in the base plate 40 in alignment with the flanges 30 and 32 respectively. These additional openings are spaced from each other and from the slot 110 by the same distance as the distance between adjacent notches in the flanges 30 and 32 of the track 10. Consequently any distortion of the track 10 or the base plate 40 will cause these openings to come into engagement with the notches 34, thereby firmly locking the traveller in its then existing position on the track 10.

I claim:

1. An adjustable pillar loop assembly comprising a vertically extending tract for mounting on the interior of the vehicle body above the level of the shoulders of an occupant of an adjacent seat and having a plurality of indexing formations adapted to face away from said seat, a traveller mounted on the track, a guide member having a slot for receiving the strap of a safety belt mounted on the traveller on the opposite side of the track to the indexing formations, a latch member mounted on the traveller for movement between a first position in which a latching formation thereon engages with one of the indexing means on the track so as to inhibit movement of the traveller along the track and a second position in which the latching formation is disengaged therefrom, resilient means for biasing the latching member into its first position, the traveller including a base plate on the same side of the track as the indexing formations and having complementary formations for engagement therewith, together with deformable means for holding the base plate away from the indexing formations.

2. An adjustable pillar loop assembly comprising a vertically extending track mounted on the interior of a vehicle body above the level of the shoulders of an occupant of an adjacent seat and having a plurality of indexing formations thereon, a traveller mounted on the track, a guide member having a slot for receiving the strap of a safety belt mounted on the traveller, a latch member mounted on the traveller for movement between a first position in which a latching formation thereon engages with one of the indexing formations so as to inhibit movement of the traveller along the track and a second position in which the latching formation is disengaged therefrom, resilient means for biasing the latching member into its first position, and pivotally mounted manual release means movable between a first position in which a blocking formation thereon engages with a complementary formation on the latch member to inhibit movement of the latter from its first position, an intermediate position in which said blocking formation is disengaged from said complementary formation and an actuating formation engages with the latch member, and a third position in which said actuating formation has moved the latch member into its second position.

3. An assembly according to claim 2, wherein the manual release means is pivotally mounted and balanced about its pivot point so as not to be susceptible to lateral acceleration.

4. An assembly according to claim 3, wherein the blocking formation and the complementary formation on the latch member are so shaped that any tendency of the latch member to move towards its second position, when the manual release means is in its first position, resists movement of the manual release means towards its intermediate position.

5. In an assembly according to claim 2 wherein said traveller further comprises a base plate located on the same side of the track as the indexing formation and having complementary formations for engaging therewith, together with deformable means for holding the base plate away from the indexing formation.

* * * * *